(12) United States Patent
Martin

(10) Patent No.: US 10,479,416 B1
(45) Date of Patent: Nov. 19, 2019

(54) CARGO RACK AND COLLAPSIBLE STAND

(71) Applicant: Jonathon David Martin, Tishomingo, OK (US)

(72) Inventor: Jonathon David Martin, Tishomingo, OK (US)

( * ) Notice: Subject to any disclaimer, the term of this patent is extended or adjusted under 35 U.S.C. 154(b) by 0 days.

(21) Appl. No.: 15/286,543

(22) Filed: Oct. 5, 2016

Related U.S. Application Data

(60) Provisional application No. 62/237,536, filed on Oct. 5, 2015, provisional application No. 62/378,207, filed on Aug. 22, 2016.

(51) Int. Cl.
*B60R 3/02* (2006.01)
*B62D 33/02* (2006.01)

(52) U.S. Cl.
CPC ............ *B62D 33/0207* (2013.01); *B60R 3/02* (2013.01)

(58) Field of Classification Search
CPC ....... B60R 3/02; B60R 9/045; B62D 33/0207; B60P 7/12
USPC ............ 296/3; 224/405, 402, 403; 410/24.1; 211/182; 414/462, 537, 538; D12/414.1
See application file for complete search history.

(56) References Cited

U.S. PATENT DOCUMENTS

| | | | | |
|---|---|---|---|---|
| 4,953,757 A | * | 9/1990 | Stevens | B60R 9/00 224/310 |
| 8,376,684 B2 | * | 2/2013 | Juarez-Ortega | B60P 3/00 280/414.1 |
| 8,684,439 B1 | * | 4/2014 | Calvert | B60P 3/40 296/3 |
| 2013/0001267 A1 | * | 1/2013 | Infantino | B60R 9/042 224/539 |
| 2015/0353021 A1 | * | 12/2015 | Orme | B60R 9/06 224/405 |

* cited by examiner

*Primary Examiner* — Stephen T Gordon
(74) *Attorney, Agent, or Firm* — Derrick Harvey; Harvey Law, P.C.

(57) ABSTRACT

The invention comprises an overhead storage rack for vehicles. The invention may further comprise a rack with a first surface and a second surface that have different altitudes. The invention may even further comprise an overhead rack for utility vehicles with a cab and a bed. The invention may even further comprise an overhead rack that includes a hoist system. The invention may even further comprise a collapsible stand for mounting atop the rack.

19 Claims, 9 Drawing Sheets

CARGO RACK AND COLLAPSIBLE STAND

BACKGROUND OF THE INVENTION

The invention comprises an overhead storage rack for vehicles. The invention may further comprise a rack with a first surface and a second surface that have different altitudes. The invention may even further comprise an overhead rack for utility vehicles with a cab and a bed. The invention may even further comprise an overhead rack that includes a hoist system. The invention may even further comprise a collapsible stand for mounting atop the rack.

1. Field of the Invention

The present invention relates to storage racks for vehicles. The invention further relates to the transportation of goods in smaller vehicles, such as ATVs and UTVs. The invention even further relates to a rack for storing bulk goods advantageous for use in environments where smaller vehicles are necessary to navigate the terrain. The invention even further relates to a rack having a stand to allow users to surmount the stand for the purposes of observation, hunting or other uses.

2. Description of Related Art

In recent times, the use of all-terrain vehicles (ATVs) and utility terrain vehicles (UTVs) have increased greatly for use in ranching, utility and pipeline maintenance, hunting, camping, and other applications. These vehicles are sometimes equipped with cargo boxes, saddle bags, bumper baskets and/or racks that extend horizontally from the seat horizon of the vehicle. However, tasks that require the transportation of goods will inevitably fall short with such limited storage space. Some accessories for smaller vehicles in the art exist within the bed of the vehicle. Trailers may attached to the vehicles, but limit the navigation and extend the length of the vehicular footprint. With the side by side vehicles and UTVs with cab and bed profiles, storage is limited in the manufacturer models, and after-market solutions have failed to provide substantial storage that leave the bed of the vehicle free and clear for its intended uses.

There exists a need for a better system of transportation goods for use with smaller vehicles. There further exists a need for an accessory to ATVs and UTVs that may be easily installed at the dealership or as a consumer aftermarket solution. There also exists a need for a system for carrying large goods without disrupting the balance of such smaller vehicles.

SUMMARY OF THE INVENTION

These and other objects were met with the present invention. The present invention An overhead rack for a utility vehicle having a cab and a bed, the rack comprising a first surface having a parallel relationship to a bed of a vehicle upon which the rack is mounted, a second surface having a parallel relationship to the first surface, the second surface being disposed at a higher altitude than the first surface, the second surface extending over a cab of the vehicle, a first vertical element extending between the first surface and the second surface on a first side of the vehicle corresponding to its driver's side, a second vertical element extending between the first surface and the second surface, the second vertical element positioned on a second side of the vehicle corresponding to its passenger's side, the rackfurther comprising a third vertical element extending between the first surface and the second surface on the first side of the vehicle, the third vertical element positioned between the first vertical element and the back of the vehicle, and a fourth vertical element extending between the first surface and the second surface of the second side of the vehicle, the fourth vertical element positioned between the second vertical element and the back of the vehicle, the first surface having an outline that fits into an internal perimeter of the bed of the vehicle, the first surface comprising a frame that mounts onto an internal perimeter of a bed of a vehicle, the frame extending between the first side and the second side of the vehicle, the first and third vertical members having a curved intersection with the first surface in the bed at the first side of the vehicle, the second and fourth vertical members having a curved intersection with the frame at the second side of the vehicle, the first surface further comprising at least one cross-member extending from the first side to the second side of the bed of the vehicle, the at least one cross-member being disposed between the first and third vertical members, and between the second and fourth members, whereby the vertical members are positioned distally of the perpendicular members, the second surface comprising a configured element, the configured element having a longitudinal element extending between a back side of the second surface and a front side of the second surface, the configured element further comprising a unifying element positioned on a portion of the second surface that is above the cab of the vehicle, the unifying element resembling a triangle whose apex is proximal to the longitudinal element at the front of the second surface, whereby the longitudinal element bisects the triangle, and the second surface comprises a base and an upper portion, the upper portion positioned at a higher altitude than the base, the upper portion forming a perimeter above the base on at least three sides, correlating to the first side of the vehicle, the second side of the vehicle, and a front side of the vehicle, and, at least some portion of the second surface comprising a guard, optionally a grating, expanded metal, or continuous surface, a hoist mounted at the first vertical element, the hoist having a connecting element with a first end to which an object of interest may attach, and a second end, a retracting mechanism that secures the second end of the connecting element to feed and retract the connecting element, and a transition element with which the connecting element may communicate to lift the object.

A second embodiment of the invention may comprise an overhead rack for a utility vehicle having a cab and a bed, the rack comprising a first surface having a parallel relationship to a bed of a vehicle upon which the rack is mounted, a second surface having a parallel relationship to the first surface, the second surface being disposed at a higher altitude than the first surface, the second surface extending over a cab of the vehicle, a first vertical element extending between the first surface and the second surface on a first side of the vehicle corresponding to its driver's side, a second vertical element extending between the first surface and the second surface, the second vertical element positioned on a second side of the vehicle corresponding to its passenger's side, a third vertical element extending between the first surface and the second surface on the first side of the vehicle, the third vertical element positioned between the first vertical element and the back of the vehicle, a fourth vertical element extending between the first surface and the second surface of the second side of the vehicle, the fourth vertical element positioned between the second vertical element and the back of the vehicle, the first and third vertical members having a curved intersection with the first surface in the bed at the first side of the vehicle, the second and fourth vertical members having a curved intersection with the frame at the second side of the vehicle, the first surface further comprising at least two cross-members extending from the first side to the second side of the bed of the vehicle, the cross-members being disposed between the first and third vertical members, and between the second and fourth members, whereby the vertical members are positioned distally of the perpendicular members, the second surface comprising a configured element, the configured element having a longitudinal element extending between a back side of the second surface and a front side of the second surface, the configured element further comprising a unifying element positioned on a portion of the second surface that is above the cab of the vehicle, the unifying element resembling a triangle whose apex is proximal to the longitudinal element at the front of the second surface, the unifying element being bisected by the longitudinal member.

A third embodiment of the invention may comprise a collapsible stand to be affixed to the second surface of the racks the first embodiment of the invention, the collapsible stand comprising a floor positioned parallel to the second surface of the rack, a crown portion disposed above the floor, the crown portion providing at least a partial perimeter above the stand, at least two legs that extend between the floor and crown portion, a ladder that may be deployed to a vertical position from the bed of the vehicle to near the second surface of the rack, so that a user may gain access to the stand for erecting the stand for use and collapsing the stand for storage atop the rack, whereby the floor is hinged to two contiguous legs, so that the floor may pivot from a parallel relationship with the two contiguous legs to a perpendicular relationship with the two contiguous legs and may be attached to the two legs.

BRIEF DESCRIPTION OF THE DRAWINGS

The invention will now be described in greater detail with reference to the drawings.

DETAILED DESCRIPTION OF THE INVENTION

The present invention provides multiple advantages over the prior art solutions. The invention provides a kit and system for overhead storage rack to be affixed on vehicles. The invention further provides a solution to limited storage on vehicles capable of traveling into challenging terrain. The invention even further provides a rack system for use with cab or canopy above the passengers and a bed behind the passenger area. The invention even further provides a solution for at least a two-tier storage profile, where light items may be stored overhead and heavier ones at the bed level. The invention provides a solution for hunters who wish use the vehicle with a stand for portable hunting with the ability to transport greater cargo than on foot.

Figure 1:
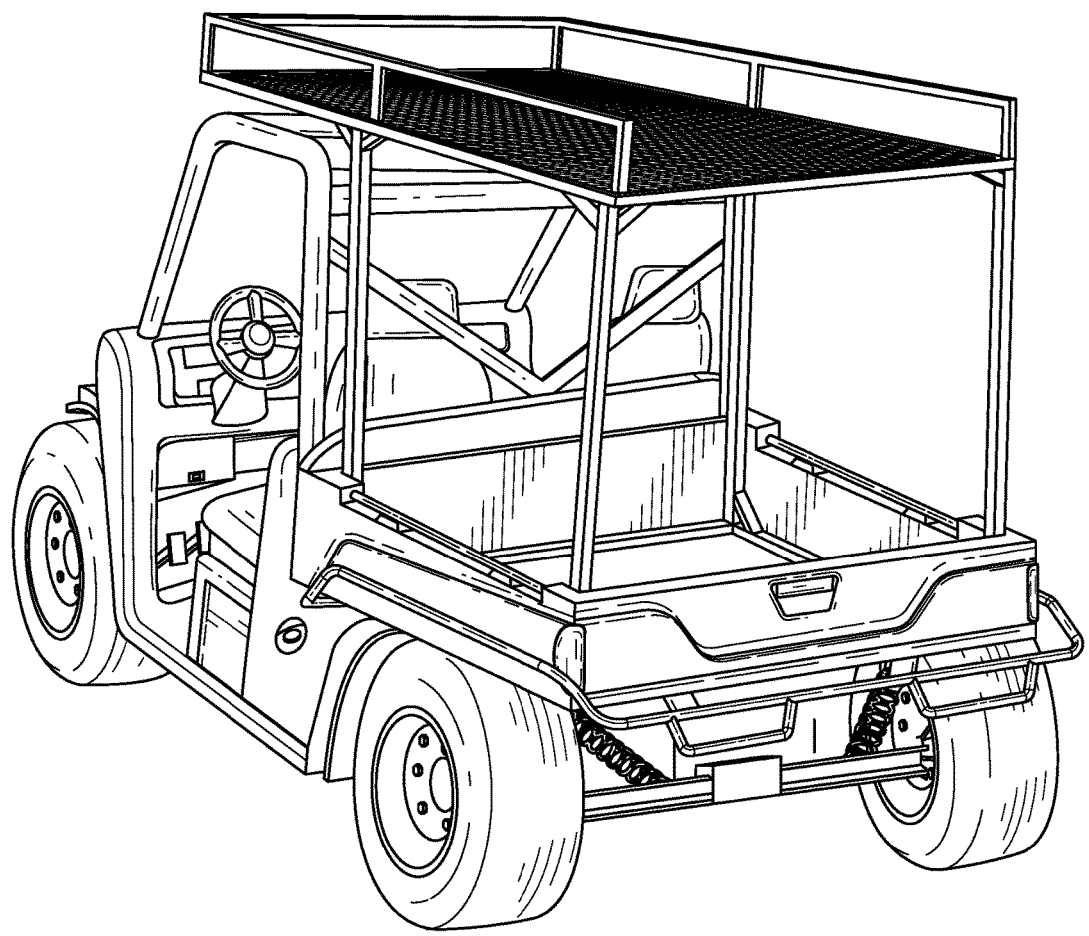
FIGS. 1-3 depict views of the overhead rack system.
Figure 2:
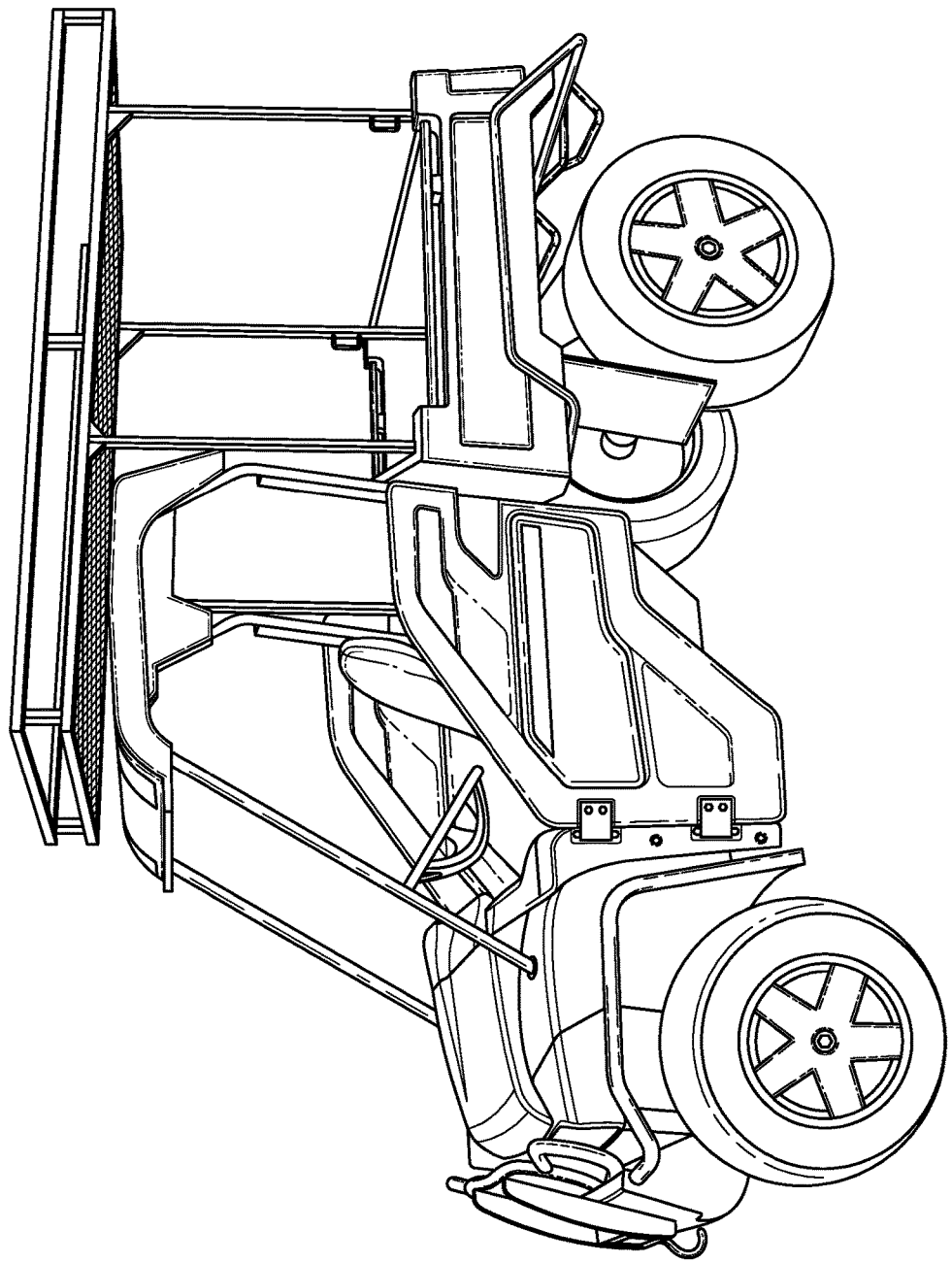
Figure 3:
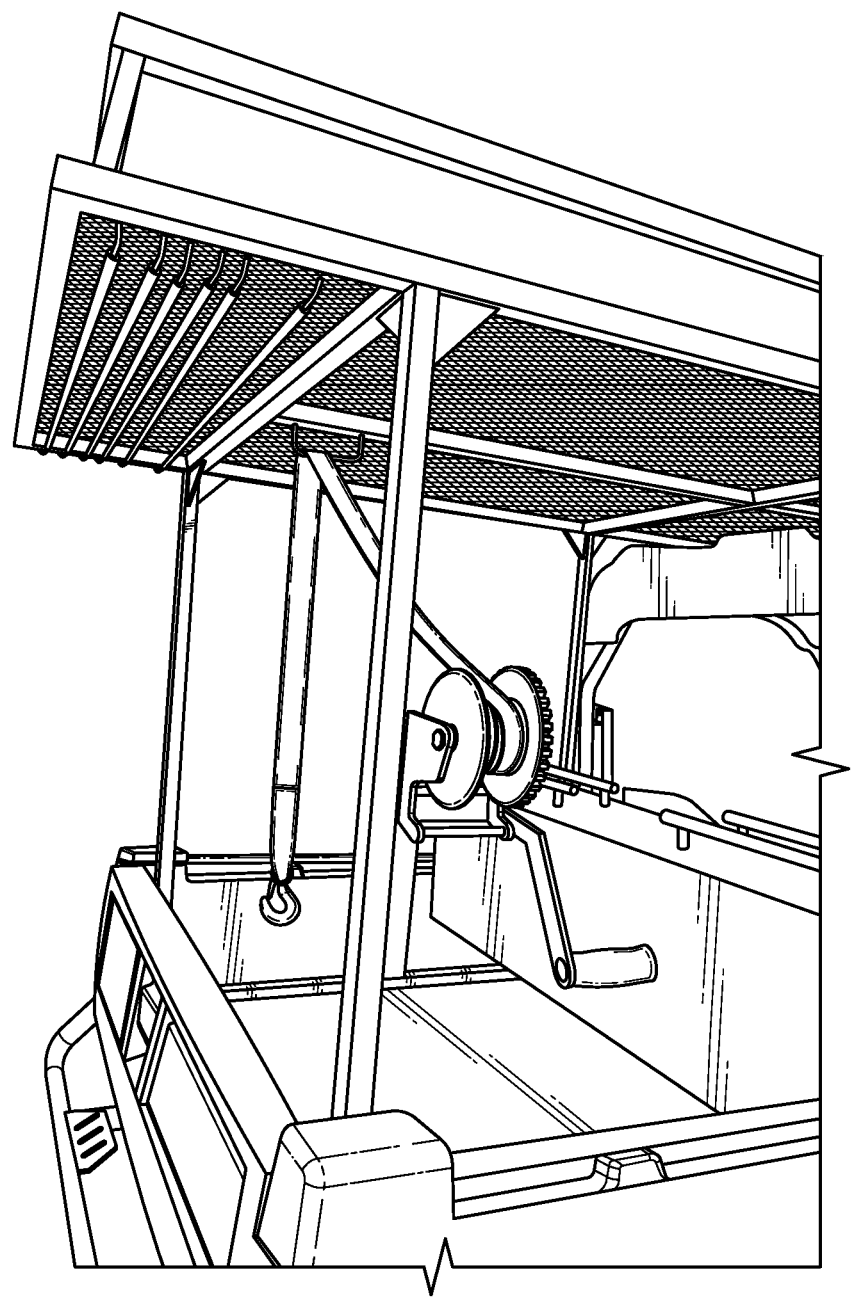
Figure 8:
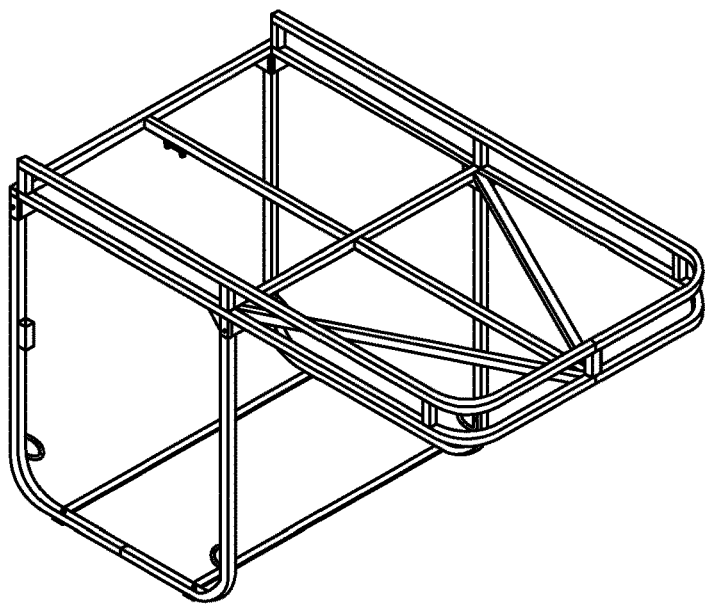
FIGS. 8-9 depict views of an embodiment of the rack system.
Figure 9:
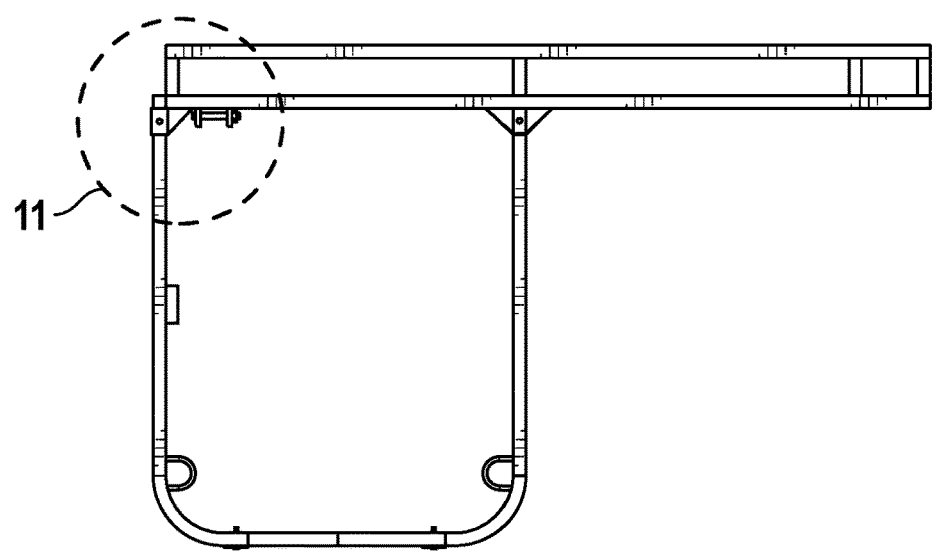

According to embodiments shown in FIGS. 1-3, the rack may comprise a bottom or first surface and a top or second surface. The second surface may extend over the cab and bed of a vehicle such as an UTV or side by side ATV, or any other vehicle that may have a cargo box type bed. The bottom or first surface may be positioned atop or mated with floor of the box type bed. As seen in FIGS. 1, 8 and 9, the bottom or first surface resembles a frame having four sides and intersections that may be angular as in FIG. 1, or arcuate as seen in FIG. 8, depending upon the profile of the vehicle bed to which the rack is intended to mate. As depicted, the bottom surface does not have a continuous surface, but rather a frame that securably seats onto the corners of the vehicle bed. In other embodiments not shown, the bottom surface may resemble other structural configurations, such as additional framework, grating, protective surfacing (such as bed lines or rubber mats). In addition, the frame work as shown in the bottom surface have alternative frames connections, so frame connections are positioned distal of the perimeter walls of the vehicle bed, such as in a tic-tac-toe grid. From the bottom or first surface, the rack may connect to the second surface as shown in FIGS. 1-4 and 8-9 by way of four vertical supports disposed between the bottom surface and the top or second surface. As seen in FIG. 1, the bracing elements may connect the vertical supports and the bottom surface. In embodiments shown in FIGS. 8 and 9, the bottom surface may connect to the vertical support with an integral construction of a curved profile. The curved profile may be manufactured as one-piece, and/or may have interconnecting pieces, such as journaling internal anchors within the frame. Still other embodiments of the invention envision connections not shown that are within the scope of this invention, especially those commonly known in the arts.

The second or top surface may connect to the vertical supports in a similar manner as the bottom or first surface. In the embodiments shown in FIG. 8, the second surface illustrates a more perpendicular connection between the second surface and the vertical supports. Second surface may comprise a base and an upper portion. The base may comprise four sides as shown in FIGS. 8 and 9, or have other n-sided configurations not shown. The upper portion may have three sides, as shown in FIG. 8 as a bar that is positioned above the exterior perimeter of the base, leaving open the side correlating to the back of the vehicle, or opposite the side of the cab of the vehicle. In other embodiments, the back of the upper portion may comprise a fourth side. In another embodiment of the invention not shown, the fourth side may comprise a back surface that may hinge generally at the base of the second surface, and pivot up to securably latch in an upright position.

Figure 4:
FIGS. 4-7 depict views of a collapsible stand positioned with an overhead rack system.

At the corners of the base and upper portion may be rounded or angular intersections. In other embodiments of the invention, the corners of the base and upper portion may have other curved or linear structural profiles that connect the sides of the base and the sides of the upper portions. Between the base and upper portions may be various connecting elements that hold the upper portion at a distance from the base. The base is shown in FIGS. 1 and 4 as a horizontal surface that extends over the cab and bed of the vehicle. In other embodiments of the invention, base may include planes that are not parallel to the horizon of the ground beneath the vehicle. En still other embodiments, base may comprise more than one surface plane.

Figure 10:
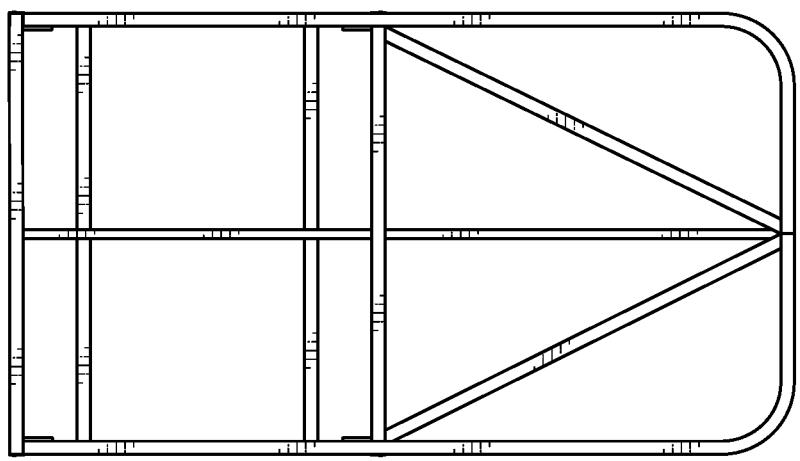
FIG. 10 depicts a top view of the structure of the overhead rack system.
Figure 11:
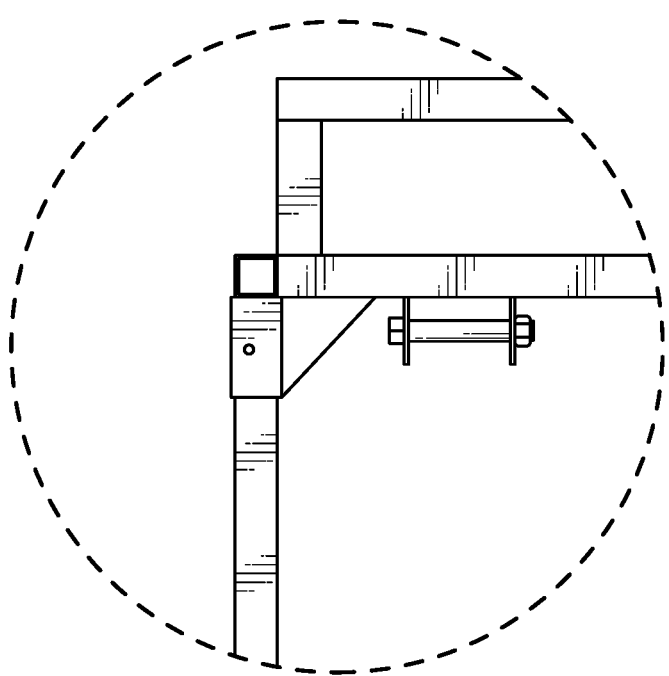
FIG. 11 depicts a side view of the overhead rack system as the top surface connects to the base surface.

In another embodiment of the invention shown in FIGS. 8 and 10, the base is shown as having a configured element at the portion of the base positioned atop the cab of the vehicle. The configured element is shown as resembling an arrow that "points" towards the front of the vehicle, though other styles of configured elements may be within the scope of the invention. The configured element may comprise a longitudinal element extending between the front of the base (correlating to the front of the vehicle) and the back of the base (correlating to the back of the vehicle). The longitudinal element may bisect a triangular element, as shown in FIG. 8, where the apex of the triangle may meet with the front of the longitudinal element at the front of the base. In the embodiment shown, configured element connects to the base approximately at the point where a supporting member is also positioned at the front. The triangular aspect of the configured element may be disposed roughly above the cab of the vehicle as shown in the FIG. 8. In other embodiments not shown, the configured element may comprise other geometric configurations that connect and support the rack, either from the base portion, from upper portion or from other structures not shown in the illustrations.

The inventive rack may be manufactured from various sizes of steel or aluminum depending upon the cargo weight capacity of the vehicle and users application. In one embodiment, the inventive rack may be attached to the vehicle by the use of a turnbuckle system or nylon ratchet straps that attach to existing cargo hooks in the bed of the vehicle. This embodiment requires a minimal amount of tools for installation on current, popular models of smaller UTV and ATV vehicles. Other embodiments may include different solutions for attaching the rack to the vehicle, including pre-manufacturing seating chambers or channels in the bed of the vehicles, or affixing such a seat atop the bed of the vehicles, into which the first surface may mate. Still other solutions of affixing the rack to a vehicle exist within the scope of this invention. For vehicles that do not have cargo hooks in the bed, the rack may be installed by drilling holes through the bed and attaching with bolts. This embodiment of the rack may also be customized with additional cross members, expanded metal mesh, ladder or hooks attached to the vertical supports to secure cargo that is placed in the cargo box or secured to the outside of the frame.

Other embodiments of the rack can also be built to accommodate light bars or spot light accessories. It may also be outfitted with a winch and pulley system to lift heavier items into the cargo box of the vehicle.

The top or second surface may include a variety of surface profiles, such as an expanded metal mesh to prevent smaller items from falling though the bottom of the frame. The floor of the frame may be constructed with square tubing cross member of various metal, composite or other material construction. As shown in FIG. 4, hunters may use the overhead rack to carry items such as collapsible duck/goose blinds, decoys, large ladder type deer stands, deer feeders, frames for feeders and other types of deer stands overhead and still leave the cargo box open for carrying tools, feed and supplies. With a winch system attached large animals such as deer or hogs can be loaded into the cargo box of the vehicle. Campers may use this overhead rack to carry large bulky items such as sleeping bags and tents, leaving the cargo box available for ice chests and supplies. Farmers and ranchers can use this to carry larger items such as fence posts, post hole diggers, calf pullers and large hand tools overhead and leave the cargo box open for smaller heavier items such as tools, hay or feed. Industrial type uses for surveyors, seismograph crews, construction companies or others, this rack allows the extra overhead capacity for hauling survey stakes, cables, larger hand tools, light weight pipe or boards.

Figure 5:
Figure 6:
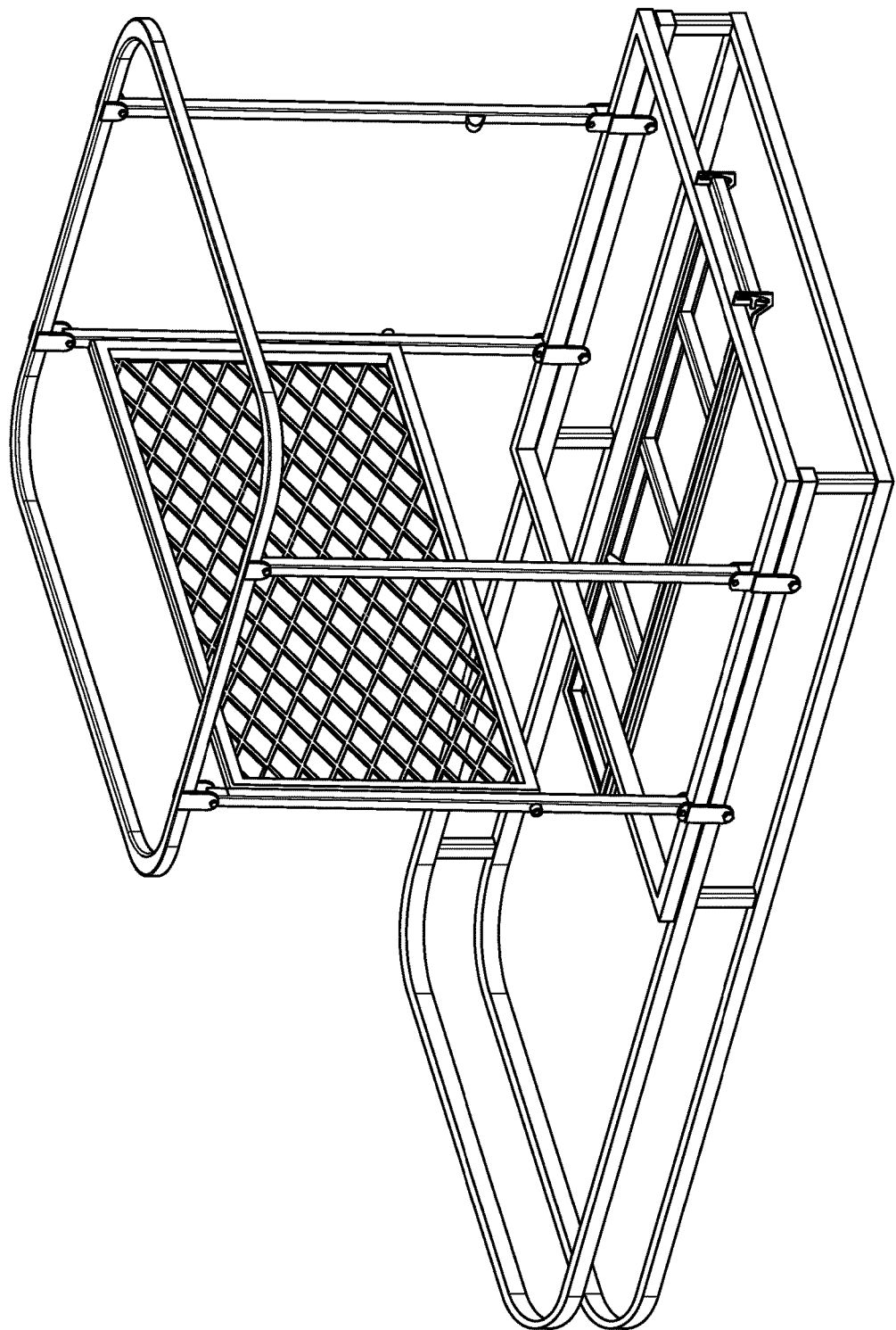
Figure 7:
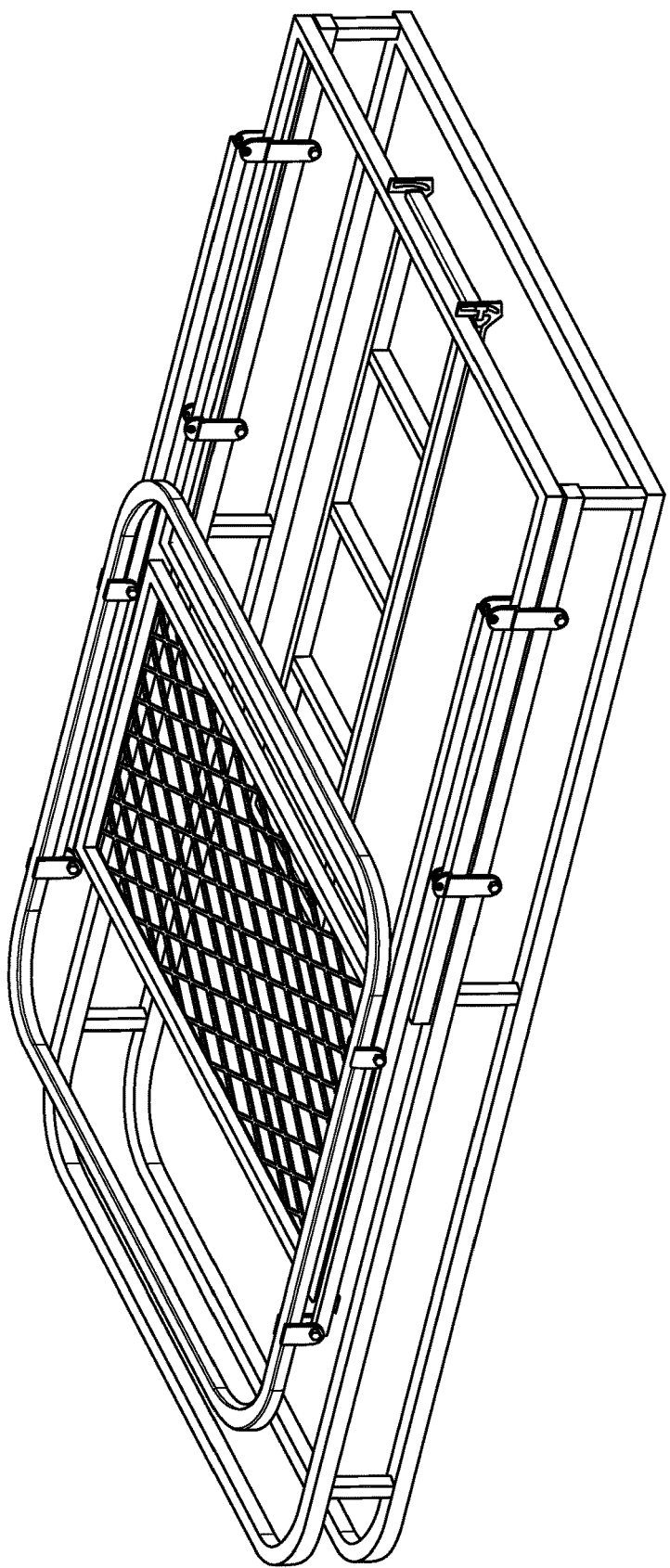

In another embodiment shown in FIGS. 5-7, a stand may be mounted upon the rack. According to the embodiments illustrated, the rack may comprise a base and an upper portion, the upper portion capable of supporting the deer stand with bolts and clamps as seen in the illustrations. The stand may have a mounting portion and four legs that extend between the upper portion of the rack and the base, as shown in FIGS. 5-7, or may have other numbers of legs or other supporting members that may mount to the upper portion and/or the base.

Continuing with the embodiment in FIGS. 5-7, the stand may further comprise a crown portion that may be supported by the legs of the stand, so that the crown portion may create a perimeter about the stand. The crown portion may have four sides with curved corners, as seen in FIGS. 5-7, or having angular corners, or may have other geometric configurations such as an n-sided polygon, a circular or wholly arcuate (but irregular) shape. Furthermore, it is within the scope of this invention for the stand to have facing between the crown portion and the stand or even the mounting portion, the facing capable of folding down during storage. Users may utilize the crown portion for safety against falling off the stand, for firearm support, and other advantageous functionality.

As seen in FIGS. 5-7, a stage may be stored in a parallel disposition between two of the legs, so that an upper portion of the stage may be detached and lowered into a perpendicular relationship with the legs. In the embodiment shown, the stage may be secured by pins (such as hitch pins or other fasteners) to the legs. In other embodiments, the stage may be secured to the upper rail of the rack, the base of the deer stand, or other features within the scope of the invention. A ladder may be stored on the deer stand for usage as shown in FIGS. 5-7, where the ladder is in a perpendicular relationship with the legs. Ladder may further comprise a track that allows the longitudinal aspects of the ladder to be secured safely, the track as shown in FIGS bisecting the base of the deer stand from the front of the vehicle to the back. As shown in the FIG. 5-7, track may comprise a slotted rail into which the legs of the ladder may be secured and stored. Other embodiments of the track not shown in illustrations may be utilized as well. As utilized and deployed, the ladder may be manipulated to fold down from a user in the bed of the vehicle. The user may then raise the deer stand from the flattened state seen in FIG. 7, so that the stand pivots up to an upright position While the present invention has been described in conjunction with the specific embodiments set forth above, many alternatives, modifications and other variations thereof will be apparent to those of ordinary skill in the art. All such alternatives, modifications and variations are intended to fall within the spirit and scope of the present invention.

What is claimed is:

1. An overhead rack for a utility vehicle having a cab and a bed, the rack comprising:
    a first surface having a parallel relationship to a bed of a vehicle upon which the rack is mounted,
    a second surface having a parallel relationship to the first surface, the second surface being disposed at a higher altitude than the first surface, the second surface extending over a cab of the vehicle,
    a first vertical element extending between the first surface and the second surface on a first side of the vehicle corresponding to its driver's side,
    a second vertical element extending between the first surface and the second surface, the second vertical element positioned on a second side of the vehicle corresponding to its passenger's side, a third vertical element extending between the first surface and the second surface on the first side of the vehicle, the third vertical element positioned between the first vertical element and the back of the vehicle, and a fourth vertical element extending between the first surface and the second surface of the second side of the vehicle, the fourth vertical element positioned between the second vertical element and the back of the vehicle, the second surface comprising a configured element, the configured element having a longitudinal element extending between a back side of the second surface and a front side of the second surface, the configured element further comprising a unifying element positioned on a portion of the second surface that is above the cab of the vehicle the unifying element resembling a triangle having a first apex proximal to the longitudinal element at the front of the second surface, whereby the longitudinal element bisects the triangle.

2. The rack in claim 1, the first surface having, an outline that fits into an internal perimeter of the bed of the vehicle.

3. The rack in claim 1, the first surface comprising a frame, that mounts onto an internal perimeter of the bed of the vehicle, the frame extending between the first side and the second side of the vehicle.

4. The rack in claim 1, the first and third vertical elements having a curved intersection with the first surface in the bed at the first side of the vehicle, the second and fourth vertical elements having a curved intersection with the first surface at the second side of the vehicle.

5. The rack in claim 4, the first surface further comprising at least one cross-member extending from the first side of the vehicle to the second side of the vehicle.

6. The rack in claim 5, the at least one cross-member being disposed between the first element and third vertical element, and between the second element and fourth element, whereby the first, second, third and fourth vertical elements are positioned distally of the at least one cross-member.

7. The rack in claim 1, the second surface comprising a base and an upper portion, the upper portion positioned at a higher altitude than the base, the upper portion forming a perimeter above the base on at least three sides, correlating to the first side of the vehicle, the second side of the vehicle, and a front side, of the vehicle.

8. The rack in claim 1, at least some portion of the second surface comprising a guard.

9. The rack in claim 1, at least some portion of the second surface comprising a grating.

10. The rack in claim 1, at least some portion of the second surface comprising expanded metal.

11. The rack in claim 1, at least some portion of the second surface comprising a continuous surface.

12. The rack in claim 1 further comprising a hoist mounted at the first vertical element, the hoist having a connecting element with a first end to which an object of interest may attach, and a second end, a retracting mechanism that secures the second end of the connecting element to feed and retract the connecting element, and a transition element with which the connecting element may communicate to lift the object.

13. The rack in claim 1 further comprising a collapsible stand having:

a floor positioned parallel to the second surface of the rack, a crown portion disposed above the floor, the crown portion providing at least a partial perimeter, at least two legs that extend between the floor and crown portion, a ladder that may be deployed to a vertical position from the bed of the vehicle to near the second surface of the rack, so that a user may gain access to the stand for erecting the stand for use and collapsing the stand for storage atop the rack.

14. The rack in claim 13, whereby the floor is hinged to the at least two legs, so that the floor may pivot from a parallel relationship with the at least two legs to a perpendicular relationship with the at least two legs and may be attached to the two legs.

15. The rack of claim 1, the second surface comprising a base and an upper portion, the upper portion positioned at a higher altitude than the base, the upper portion forming a perimeter about the base on at least three sides, the three sides correlating to the first side of the vehicle, the second side of the vehicle, and a front side of the vehicle.

16. An overhead rack for a utility vehicle having a cab and a bed, the rack comprising:

a first surface having a parallel relationship to a bed of a vehicle upon which the rack is mounted, a second surface having a parallel relationship to the first surface, the second surface being disposed at a higher altitude than the first surface, the second surface extending over a cab of the vehicle, a first vertical element extending between the first surface and the second surface on a first side of the vehicle corresponding to its driver's side, a second vertical element extending between the first surface and the second surface, the second vertical element positioned on a second side of the vehicle corresponding to its passenger's side, a third vertical element extending between the first surface and the second surface on the first side of the vehicle, the third vertical element positioned between the first vertical element and a back of the vehicle, a fourth vertical element extending between the first surface and the second surface of the second side of the vehicle, the fourth vertical element positioned between the second vertical element and the back of the vehicle, the first and third vertical elements having a curved intersection with the first surface in the bed at the first side of the vehicle, the second and fourth vertical elements having a curved portion, the second surface having a longitudinal element extending between a back side of the second surface and a front side of the second surface, the longitudinal element extending through a triangular element positioned on a portion of the second surface that is above the cab of the vehicle so that the triangular element has a first apex congruent with the longitudinal element towards the front of the second surface.

17. The rack in claim 16 further having a collapsible stand having the collapsible stand comprising:

a floor positioned parallel to the second surface of the rack, a crown portion disposed above the floor, the crown portion providing at least a partial perimeter, at least two legs that extend between the floor and crown portion, a ladder that may be deployed to a vertical position from the bed of the vehicle to near the second surface of the rack, so that a user may gain access to the stand for erecting, the stand for use and collapsing the stand for storage atop the rack.

18. The rack in claim 17, whereby the floor is hinged to the at least two legs, so that the floor may pivot from a parallel relationship with the at least two legs to a perpendicular relationship with the at least two legs and may be attached to the two legs.

19. The rack of claim 17, the second surface comprising a base and an upper portion, the upper portion positioned at a higher altitude than the base, the upper portion forming a perimeter about the base on at least three sides, the three sides correlating to the first side of the vehicle, the second side of the vehicle, and a front side of the vehicle.

* * * * *